(12) United States Patent
Sonnenberg et al.

(10) Patent No.: US 6,679,536 B1
(45) Date of Patent: Jan. 20, 2004

(54) FOLDABLE AND TUMBLABLE SEAT SYSTEM

(75) Inventors: Karl Otto Sonnenberg, Ferndale, MI (US); Mohammad Saberan, New Baltimore, MI (US); Paul Castellani, Sterling Heights, MI (US); Todd Jerome Gilson, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/252,229

(22) Filed: Sep. 23, 2002

(Under 37 CFR 1.47)

(51) Int. Cl.$^7$ ................................................. B60N 2/02
(52) U.S. Cl. ............................... 296/65.09; 296/65.16; 296/69; 297/337; 297/378.12
(58) Field of Search ............................... 296/63, 65.01, 296/65.05, 65.09, 65.16, 69; 297/335, 336, 378.12, 331, 334

(56) References Cited

U.S. PATENT DOCUMENTS

| | | |
|---|---|---|
| 4,376,552 A | 3/1983 | Pilhall |
| 4,484,779 A * | 11/1984 | Suzuki ........................ 297/326 |
| 4,771,507 A | 9/1988 | Draplin et al. |
| 4,805,953 A | 2/1989 | Yamauchi |
| 4,932,706 A | 6/1990 | Wainwright et al. |
| 4,979,773 A | 12/1990 | Eubank |
| 5,011,210 A | 4/1991 | Inoue |
| 5,044,683 A | 9/1991 | Pärsson |
| 5,052,748 A * | 10/1991 | Fourrey et al. ............. 297/124 |
| 5,482,349 A | 1/1996 | Richter et al. |
| 5,492,386 A | 2/1996 | Callum |
| 5,570,931 A | 11/1996 | Kargilis et al. |
| 5,593,208 A | 1/1997 | Mitschelen et al. |
| 5,738,411 A | 4/1998 | Sutton et al. |
| 5,795,023 A * | 8/1998 | Kayumi ...................... 297/331 |
| 5,826,942 A | 10/1998 | Sutton et al. |
| 5,879,053 A | 3/1999 | Lux et al. |
| 5,904,404 A | 5/1999 | McCulloch et al. |
| 5,913,570 A | 6/1999 | Yoshida et al. |
| 5,941,602 A | 8/1999 | Sturt et al. |
| 5,971,467 A * | 10/1999 | Kayumi et al. ............... 296/66 |
| 6,000,742 A | 12/1999 | Schaefer et al. |
| 6,010,190 A | 1/2000 | Downey |
| 6,012,755 A | 1/2000 | Hecht et al. |
| 6,070,939 A | 6/2000 | Matsuo et al. |
| 6,113,172 A | 9/2000 | Chaloult et al. |
| 6,113,187 A | 9/2000 | Sugiyama et al. |
| 6,135,555 A | 10/2000 | Liu et al. |
| 6,139,104 A * | 10/2000 | Brewer ....................... 297/353 |
| 6,152,533 A | 11/2000 | Smuk |
| 6,174,030 B1 | 1/2001 | Matsuo |
| 6,183,032 B1 * | 2/2001 | Champ .................... 296/65.03 |
| 6,193,317 B1 | 2/2001 | Mitschelen et al. |
| 6,196,613 B1 * | 3/2001 | Arai ....................... 296/65.13 |
| 6,199,951 B1 | 3/2001 | Zeile et al. |
| 6,203,104 B1 | 3/2001 | Matsuo et al. |
| 6,227,619 B1 | 5/2001 | Pesta et al. |
| 6,231,102 B1 * | 5/2001 | Wyszogrod et al. ..... 296/65.01 |
| 6,234,553 B1 | 5/2001 | Eschelbach et al. |
| 6,283,550 B1 | 9/2001 | Vialatte et al. |
| 6,293,603 B1 | 9/2001 | Waku et al. |
| 6,513,876 B1 * | 2/2003 | Agler et al. ........... 297/378.14 |

* cited by examiner

*Primary Examiner*—D. Glenn Dayoan
*Assistant Examiner*—Patricia L. Engle
(74) *Attorney, Agent, or Firm*—Bill C. Panagos

(57) ABSTRACT

A foldable and tumblable seat assembly includes a base having a front end and a rear end. The front end of the base is pivotally connected to a vehicle floor. A seat bottom frame having a front end and a rear end is also provided. The front end of the seat bottom frame is pivotally connected proximate the front end of the base. The seat assembly includes a lower arm having an upper end and a lower end. The lower end of the lower arm is pivotally connected proximate the rear end of the base. The invention also provides an upper arm having an upper end and lower end. The lower end of the upper arm is pivotally connected to the upper end of the lower arm. A seat back is attached to at least the upper arm.

21 Claims, 4 Drawing Sheets

FOLDABLE AND TUMBLABLE SEAT SYSTEM

BACKGROUND OF THE INVENTION

1. Field of the Invention

The invention relates to rear seat assemblies that tumble and fold.

2. Background Art

Minivans and SUVs are popular in part due to their vast storage capabilities. These vehicles have rear seats and often times auxiliary or third row seating. The seats are anchored to a vehicle floor and have a seat cushion and a seat back. To further increase the storage capacity of the vehicle, the seats need to be stored. Two popular storage options are (1) to pivot the seat cushion forward and fold the seat back into the space previously occupied by the seat (known as "fold flat") and (2) to fold the seat back onto the seat cushion and pivot both the seat back and seat cushion forward (known as "fold and tumble"). Both options have benefits and drawbacks.

Accordingly, it is desirable to design a seat assembly that combines the advantages of the fold-flat and fold-and-tumble seat assemblies without any of the drawbacks.

SUMMARY OF THE INVENTION

The present invention provides a foldable and tumblable seat assembly having a base having a front and a rear end. The front end of the base is pivotally connected to the vehicle floor. A seat bottom frame having a front end and a rear end is also provided. The front end of the seat bottom frame is pivotally connected proximate the front end of the base. The seat assembly includes a lower arm having an upper end and a lower end. The lower end of the lower arm is pivotally connected proximate the rear end of the base. The invention also provides an upper arm having an upper end and lower end. The lower end of the upper arm is pivotally connected to the upper end of the lower arm. A seat back is attached to at least the upper arm.

The seat may be used as either a fold-flat seat or a fold-and-tumble seat. To use it as a fold-flat seat, the seat bottom frame is pivoted forward proximate the front end and the seat back is pivoted downwardly by pivoting the lower arm proximate its lower end. To use the seat as a fold-and-tumble seat, the seat back is pivoted about the connection between the upper arm and lower arm such that the seat back is laying on top of the seat bottom frame. The seat bottom frame and the seat back are then pivoted forward.

DETAILED DESCRIPTION OF THE PREFERRED EMBODIMENT(S)

Figure 1:
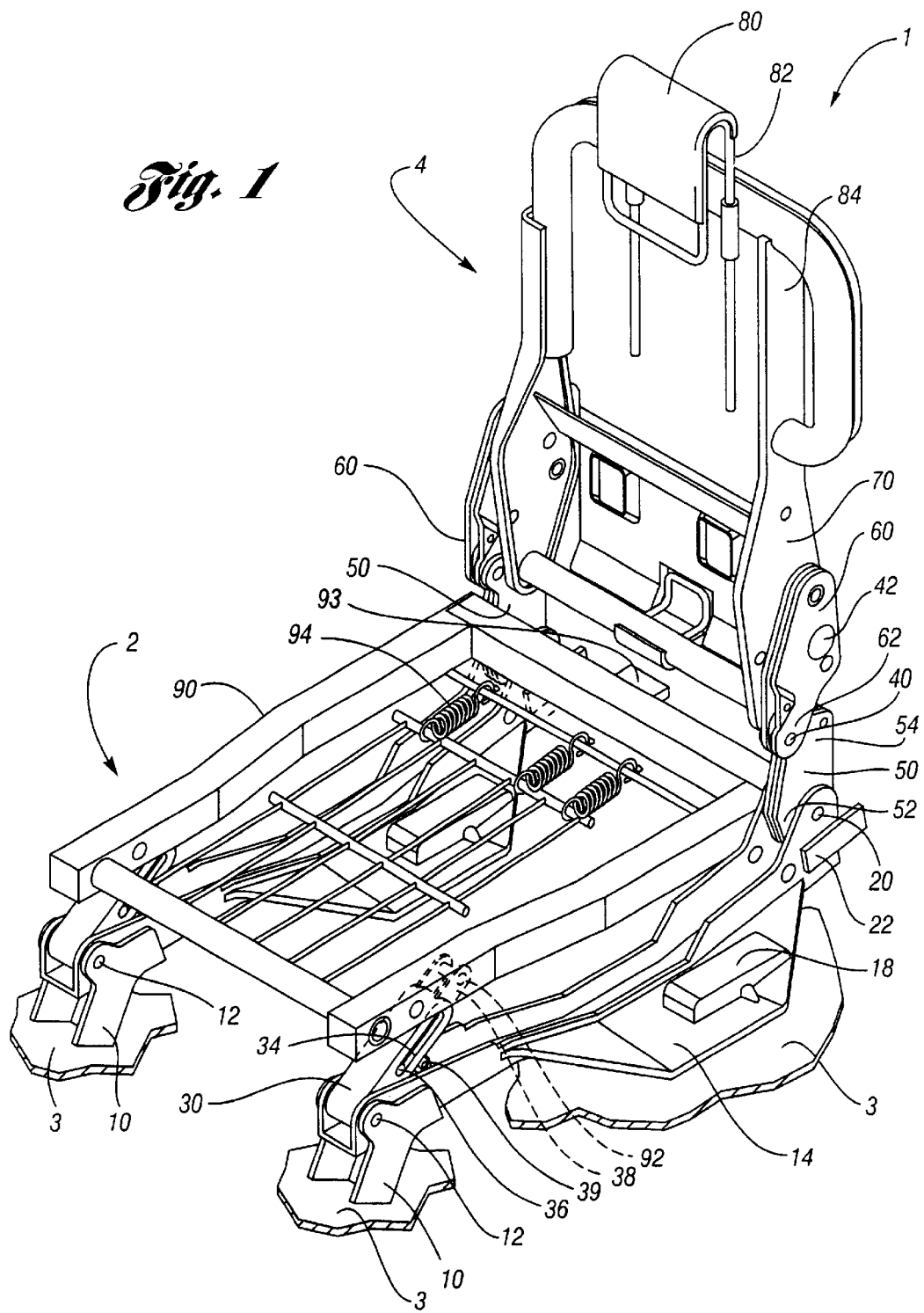
FIG. 1 is a perspective view of the seat assembly of the present invention in its upright use position.

FIGS. 1–4 show a seat assembly 1 embodying the features of the present invention adapted to be mounted on a vehicle floor and designed to be foldable and tumblable. The assembly may be utilized in many different environments. However, the seat assembly 1 is particularly suited to be used as a second or auxiliary seat in a sport utility vehicle or a van. Reference numeral 2 generally designates the lower seat portion and reference numeral 4 generally designates the upright seat back portion. Reference numeral 3 generally refers to the vehicle floor.

A mounting bracket 10 is secured to the vehicle floor 3 using known techniques such as, but not limited to, nuts and bolts, other fasteners, or welding. The particular embodiment illustrated in the Figures contains two such mounting brackets 10, one on the left side and one on the right side. Although the illustrations depict two brackets and two of all the corresponding components, it is within the scope of the invention to design a seat assembly 1 having a single, or more than two, of the seat assembly components described herein.

A base 14 is pivotally connected to the mounting bracket 10 at first pivot 12. The first pivot may comprise alignable apertures in both the mounting bracket 10 and the base 14 and a dowel rod inserted therethrough, a portion of one of the base or mounting bracket extending through the other of the base or mounting bracket, or other known pivot making techniques.

The base 14 is releasably attached to the vehicle floor 3 using first latch and release mechanism 18 according to techniques known in the art. When latched, the first latch and release mechanism 18 prevents the seat assembly 1 from pivoting about the first pivot 12. The latches and release mechanisms described in this application may be combined or, alternatively, the release mechanism may be separate from the latch as is well known in the art. Further, the latches and release mechanism may be in locations different than shown in the drawings.

The latches and release mechanisms may include springs to bias the components either upwardly or downwardly as is known in the art.

The lower end 52 of a lower arm 50 pivotally connects to the rear of the base 14 at second pivot 20. Second pivot 20 may be constructed in any manner such as those described above. A second latch and release mechanism 22 releasably secures the second pivot to prevent the upright seat back portion 4 from pivoting/about the second pivot 20.

The bottom 62 of an upper arm 60 pivotally connects to the upper end 54 of the lower arm 50 at third pivot 40. As discussed above, the third pivot may be constructed in any manner.

A third latch and release mechanism 42 releasably secures the third pivot point 40 to prevent the upper arm 60 and the upright seat back portion 4 from pivoting about the third pivot.

Figure 2:
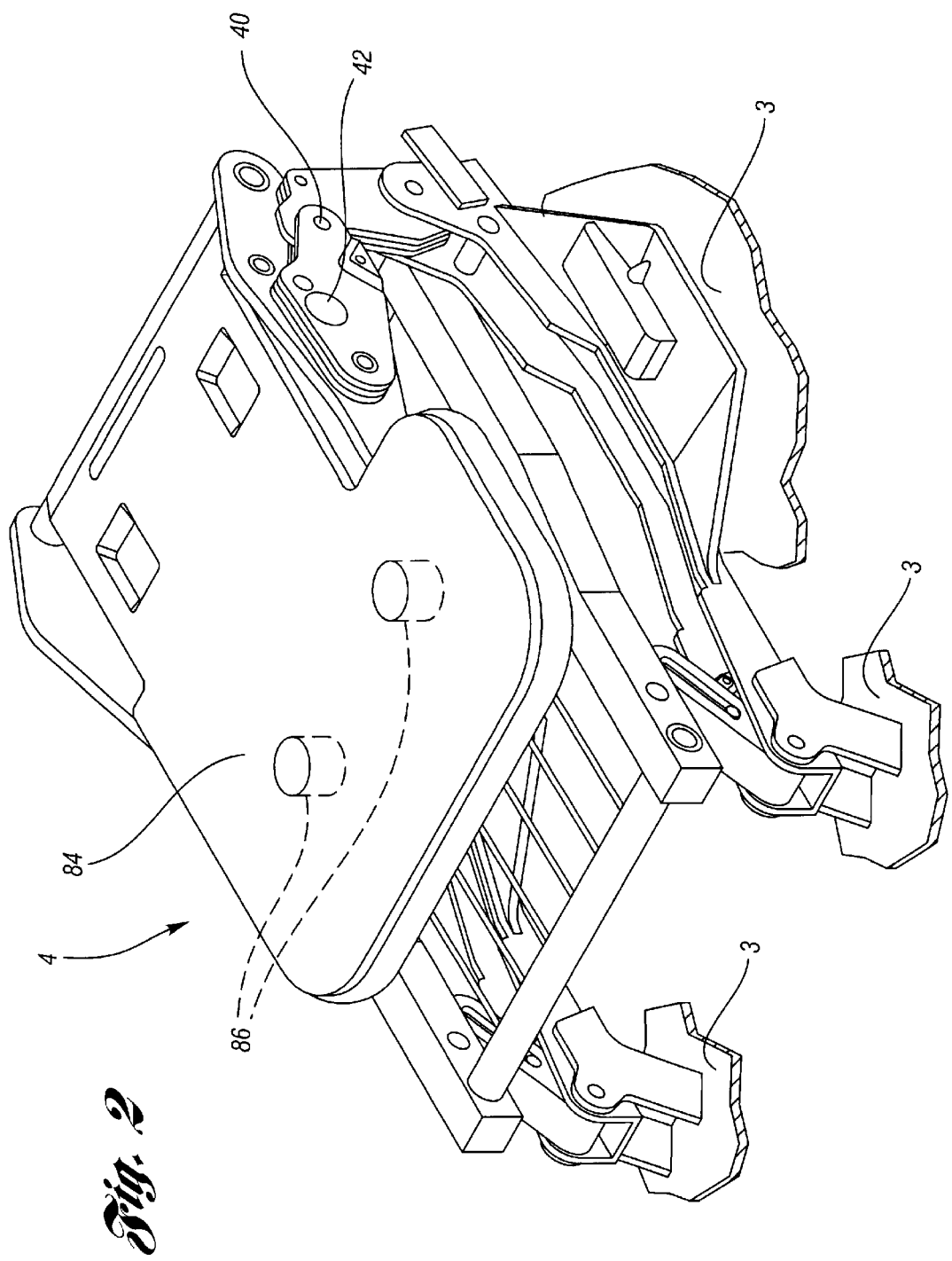
FIG. 2 is a perspective view of the seat assembly of the present invention in its folded position.

A seat frame 70 is secured to the upper arm 60 using known techniques. The seat frame may comprise a headrest 80, a headrest bracket 82, and a seat back panel 84. As is known in the art, the seat frame 70 may comprise padding and upholstery (not shown) or another surface for comfort and a finished appearance. The seat back 84 may include cup holders 86 that are useable when the seat back portion 4 is folded down as shown in FIG. 2.

The seat assembly 1 also comprises a seat bottom frame 90 releasably attached to the base 14 or the vehicle floor using fourth latch and release mechanism 93.

One end of a seat support 30 is preferably pivotally attached to the base 14 and/or the mounting bracket 10 at the first pivot 12. Each seat support 30 comprises a slot 34 sized to accommodate a protrusion 36 from an extension support bar 38 which limits extension of the seat bottom frame 90 as it pivots about the first pivot. The other end of the extension support bar 38 pivotally attaches to the seat bottom frame 90 at a fourth pivot 92 using known techniques.

The seat bottom frame 90 is designed to accommodate a passenger. The seat bottom frame 90 can be designed in any way known in the art but is illustrated as having a series of springs 94 to support a seat cushion (not shown) as is known in the industry. Alternatively, the seat bottom frame 90 may comprise a rugged seating surface (not shown).

A separate arm support 39 may be attached to either the seat support 30 or extension support bar 38 to support the seat when in use.

Figure 3:
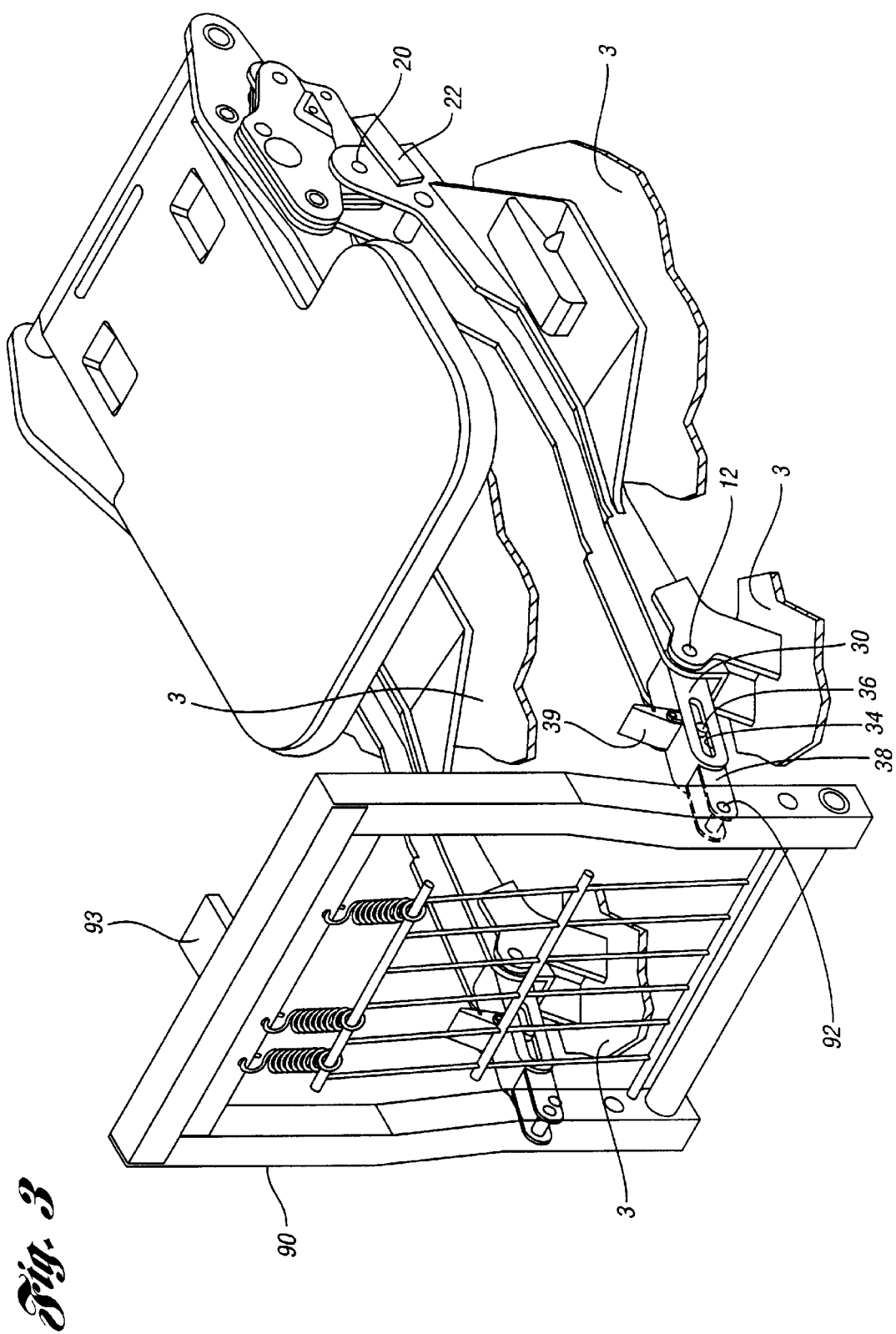
FIG. 3 is a perspective view of the seat assembly of the present invention in its fold-flat position.
Figure 4:
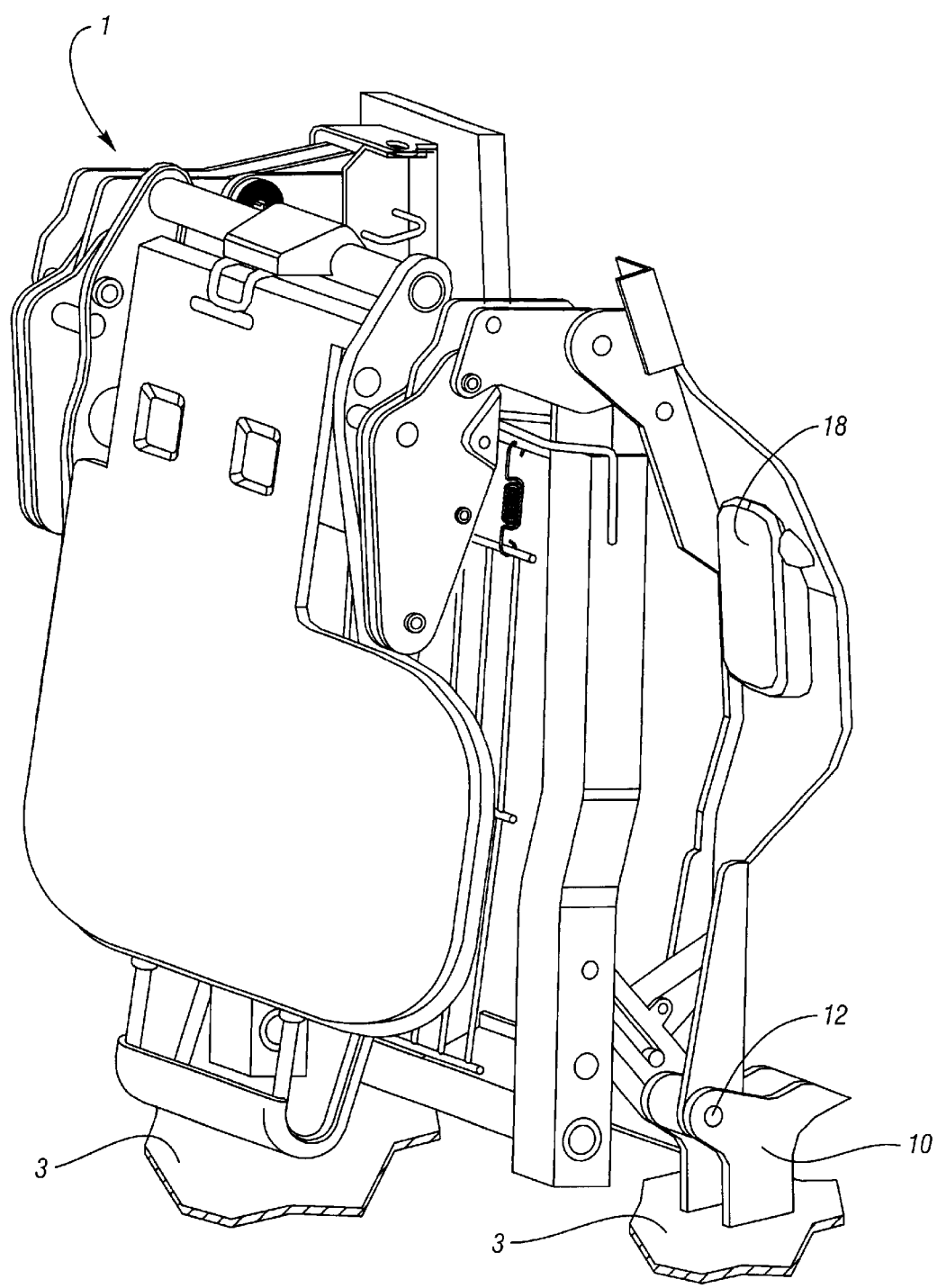
FIG. 4 is a perspective view of the seat assembly of the present invention in its tumbled position.

FIG. 1 shows the seat in its normal use position. FIG. 2 shows the seat in its folded position. FIG. 3 shows the seat assembly in its fold-flat position. FIG. 4 shows the seat in its fold-and-tumble position.

In operation, the fold position shown in FIG. 2 is obtained by releasing third latch and release 42 and applying a manual downward force to the seat back portion 4 until it reaches its fold position. Alternatively, springs (not shown) or other mechanical or electromechanical means may be used to fold the seat back portion 4. The third latch and release mechanism 42 may releasably secure the seat back portion 4 in its folded position. Alternatively, other latch and release mechanisms may be used to releasably secure the seat back portion 4 in its folded position.

This increases the storage by pivoting down the upright seat back 4 allowing the upright seat back portion 4 to pivot about the third pivot 40. The seat back panel 84 can now be used as a load carrying surface. The seat back portion 4 may rest upon the lower seat portion 2 for added support.

To tumble the seat assembly 1 as shown in FIG. 4, the first latch and release 18 is released allowing the seat assembly 1 to pivot about its first pivot 12 on the mounting brackets 10. The fold-and-tumble position further increases the storage capacity of the vehicle and allows easier access to the vehicle interior behind the seat assembly 1.

To return the seat assembly 1 to its upright position shown in FIG. 1, a force is exerted on the seat back portion 4 to pivot it upwards until latch and release mechanism secure the seat back portion in its upright position. The force may be manual or assisted. Latches and release mechanisms may need to be released prior to applying the upward force.

The fold-flat position of FIG. 3 is accomplished by first releasing fourth latch and release 93 allowing seat bottom frame 90 to pivot about first pivot 12 and fourth pivot 92 and applying an upward force on the seat bottom frame. The force may be manual or assisted. The second latch and release mechanism 22 is released to pivot the seat back frame around the second pivot 20 and a force is applied to pivot the seat back portion 4 downwardly.

The seat back panel 84 can now be used as a load carrying surface that is lower than the load carrying surface shown in the fold position illustrated in FIG. 2.

To return the seat assembly 1 to its upright position shown in FIG. 1, a force is exerted on the seat back portion 4 to pivot it upwards until latch and release mechanism secure the seat back portion in its upright position. The force may be manual or assisted. Next, a force is applied to the seat bottom frame to pivot it back to its use position as shown in FIG. 1. Latches and release mechanisms may need to be released prior to applying the upward force.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Alternatively, first pivot 12 can be designed by having a series of apertures and/or protrusions in the mounting bracket 10, base 14, and seat support 30.

What is claimed is:

1. A vehicle seat assembly for a vehicle having a vehicle floor, the vehicle seat assembly comprising:
    a base having a front end and a rear end, the front end of the base being configured to be pivotally connected to the vehicle such that the base is pivotable relative to the vehicle floor;
    a seat bottom frame having a front end and a rear end, the front end of the seat bottom frame being pivotally connected to the base proximate the front end of the base;
    a lower arm having an upper end and a lower end, the lower end of the lower arm being pivotally connected to the base proximate the rear end of the base;
    an upper arm having an upper end and a lower end, the lower end of the upper arm being pivotally connected to the upper end of the lower arm; and
    a seat back attached to at least the upper arm.

2. The vehicle seat assembly of claim 1 further comprising a base latch to releasably secure the base to the vehicle floor.

3. The vehicle seat assembly of claim 1 further comprising a seat bottom frame latch to releasably secure the seat bottom frame to the base.

4. The vehicle seat assembly of claim 1 further comprising a lower arm latch to releasably secure the lower arm to the base.

5. The vehicle seat assembly of claim 1 further comprising an upper arm latch to releasably secure the upper arm to the lower arm.

6. The vehicle seat assembly of claim 1 comprising two upper arms and two lower arms.

7. The vehicle seat assembly of claim 1 further comprising a seat support having a first end and a second end, wherein the first end of the seat support is pivotally connected to the seat bottom frame and the second end of the seat support is pivotally connected to the base, and wherein the seat bottom frame is pivotally connected to the base via the seat support.

8. The vehicle seat assembly of claim 1 further comprising a seat support having a first end and a second end and an extension support bar having a first end and a second end,
    wherein the first end of the extension support bar is pivotally connected to the seat bottom frame;
    wherein the second end of the extension support bar is slidingly secured to the seat support;
    wherein the second end of the seat support is pivotally connected to the base; and
    wherein the seat bottom frame is pivotally connected to the base via the seat support and extension support bar.

9. The vehicle seat assembly of claim 1 further comprising a mounting bracket configured to be mounted to the vehicle, wherein the base and the seat bottom frame are pivotally connected to the mounting bracket.

10. The vehicle seat assembly of claim 1 wherein the base and the seat bottom frame are both pivotable about a first pivot point.

11. The vehicle seat assembly of claim 1 further comprising a seat support having a first end and a second end, the first end of the seat support being pivotally connected to the seat bottom frame, and the second end of the seat support being pivotally connected to the base such that the base and the seat support are both pivotable about a first pivot point.

12. The vehicle seat assembly of claim 11 wherein the seat bottom frame is also pivotable about the first pivot point.

13. A vehicle seat assembly for a vehicle having a vehicle floor, the vehicle seat assembly comprising:
- a base having a front end and a rear end, the front end of the base being configured to be pivotally connected to the vehicle floor;
- a seat bottom frame having a front end and a rear end;
- an extension support bar having a first end and a second end, the first end of the extension support bar pivotally connected to the seat bottom frame proximate the front end of the seat bottom frame;
- a seat support having a first end and a second end, the extension support bar proximate the second end of the extension support bar slidingly secured to the seat support proximate the first end of seat support and the second end of the seat support pivotally secured to the base proximate the front end of the base;
- a lower arm having an upper end and a lower end, the lower end of the lower arm pivotally connected proximate the rear end of the base;
- an upper arm having an upper end and a lower end, the lower end of the upper arm pivotally connected to the upper end of the lower arm; and
- a seat back attached to at least the upper arm.

14. A vehicle seat assembly for a vehicle having a vehicle floor, the vehicle seat assembly comprising:
- a base having a front and a rear end, the front end of the base being configured to be pivotally connected to the vehicle floor such that the base is pivotable with respect to the floor about a first pivot point;
- a seat bottom frame having a front end and a rear end, the front end of the seat bottom frame being pivotally connected to the front end of the base such that the seat bottom frame is pivotable with respect to the base about a second pivot point;
- a lower arm having an upper end and a lower end, the lower end of the lower arm being connected to the rear end of the base;
- an upper arm having an upper end and a lower end, the lower end of the upper arm being connected to the upper end of the lower arm;
- a seat back attached to at least the upper arm;
- means for pivoting the lower arm relative to the base about a third pivot point proximate the lower end of the lower arm; and
- means for pivoting the upper arm relative to the lower arm about a fourth pivot point.

15. The vehicle seat assembly of claim 14 further comprising means for releasably securing the base relative to the vehicle floor.

16. The vehicle seat assembly of claim 16, further comprising means for releasably securing the seat bottom angularly relative to the base.

17. The vehicle seat assembly of claim 14 further comprising means for releasably securing the lower arm angularly relative to the base.

18. The vehicle seat assembly of claim 14 further comprising means for releasably securing the upper arm angularly relative to the lower arm.

19. The vehicle seat assembly of claim 16 wherein the seat bottom frame is also pivotable about the first pivot point.

20. The vehicle seat assembly of claim 14 further comprising a seat support having a first end and a second end, the first end of the seat support being pivotally connected to the seat bottom frame, and the second end of the seat support being pivotally connected to the base such that the base and the seat support are both pivotable about the first pivot point.

21. The vehicle seat assembly of claim 20 wherein the seat bottom frame is also pivotable about the first pivot point.

* * * * *

UNITED STATES PATENT AND TRADEMARK OFFICE
CERTIFICATE OF CORRECTION

PATENT NO.    : 6,679,536 B1
DATED         : January 20, 2004
INVENTOR(S)   : Karl Otto Sonnenberg et al.

It is certified that error appears in the above-identified patent and that said Letters Patent is hereby corrected as shown below:

Column 6,
Lines 20 and 29, delete "16" and insert -- 14 -- therefor.

Signed and Sealed this

Sixth Day of July, 2004

JON W. DUDAS
*Acting Director of the United States Patent and Trademark Office*